(12) United States Patent
Foster et al.

(10) Patent No.: US 10,981,730 B1
(45) Date of Patent: Apr. 20, 2021

(54) INTERNAL MEASUREMENT FEEDBACK AUGER SYSTEM

(71) Applicant: Laidig Systems, Inc., Mishawaka, IN (US)

(72) Inventors: Matthew James Foster, Mishawaka, IN (US); Spencer Lawrence Miller, South Bend, IN (US); Michael Ryan Genovese, South Bend, IN (US); Ryan Adam Williams, North Liberty, IN (US); Thomas Walter Lindenman, South Bend, IN (US)

(73) Assignee: Laidig Systems, Inc., Mishawaka, IN (US)

( * ) Notice: Subject to any disclaimer, the term of this patent is extended or adjusted under 35 U.S.C. 154(b) by 0 days.

(21) Appl. No.: 16/727,027

(22) Filed: Dec. 26, 2019

(51) Int. Cl.
| | |
|---|---|
| *B65G 43/02* | (2006.01) |
| *B65G 33/10* | (2006.01) |
| *B65G 33/26* | (2006.01) |
| *B65G 65/46* | (2006.01) |
| *G01S 17/08* | (2006.01) |
| *H04B 7/14* | (2006.01) |
| *G01S 17/88* | (2006.01) |

(52) U.S. Cl.
CPC .............. *B65G 43/02* (2013.01); *B65G 33/10* (2013.01); *B65G 65/466* (2013.01); *G01S 17/08* (2013.01); *G01S 17/88* (2013.01); *H04B 7/14* (2013.01); *B65G 2201/042* (2013.01); *B65G 2811/095* (2013.01)

(58) Field of Classification Search
None
See application file for complete search history.

(56) References Cited

U.S. PATENT DOCUMENTS

| | | | | |
|---|---|---|---|---|
| 3,675,367 | A * | 7/1972 | Amburn | B65G 33/265 47/1.3 |
| 3,759,367 | A * | 9/1973 | Elliott | B03C 1/0332 198/619 |
| 3,759,376 | A * | 9/1973 | Lisowski | B65D 75/38 206/388 |
| 4,274,786 | A * | 6/1981 | Svensson | D21B 1/06 414/218 |
| RE31,023 | E * | 9/1982 | Hall, III | A01D 46/24 137/236.1 |
| 6,865,955 | B2 * | 3/2005 | Nassar | B65G 43/02 73/828 |

* cited by examiner

*Primary Examiner* — Kavel Singh
(74) *Attorney, Agent, or Firm* — Botkin & Hall, LLP

(57) ABSTRACT

An auger system having an auger with an internal measurement system that is contained within the auger. The measurement system has a power source located within the auger and a sensor for measuring at least one condition within the auger. The measurement system is connected to the power source and a transmitter is powered by the power source to transmit a signal from the sensor. A receiver receives the signal from the transmitter and is spaced from the transmitter. The signal is then sent to a control system that compares the signal to a predetermined value to determine whether the condition measured is within an acceptable range. The control system may alter inputs into components for moving the auger until said condition is within an acceptable range.

20 Claims, 20 Drawing Sheets

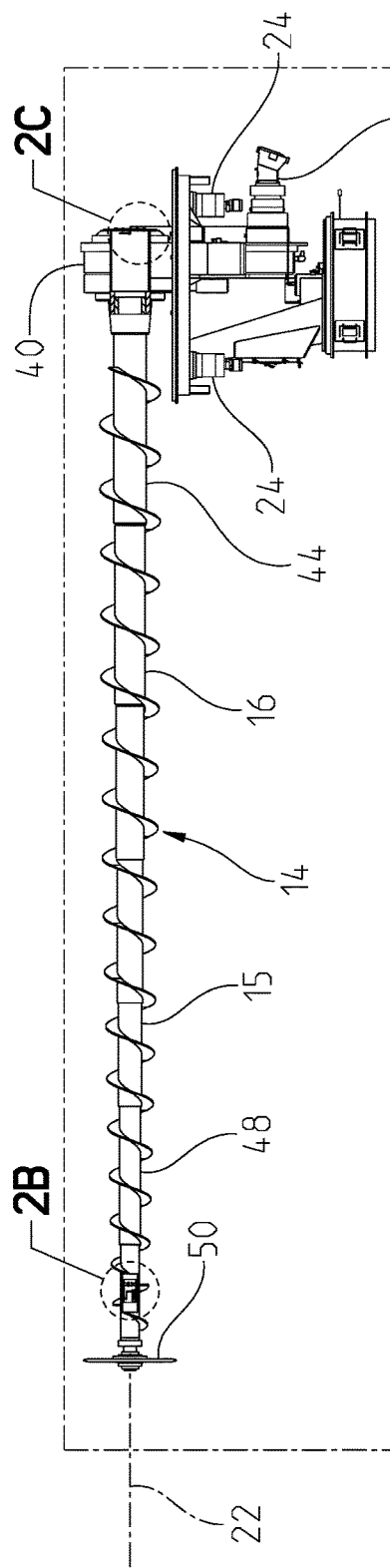
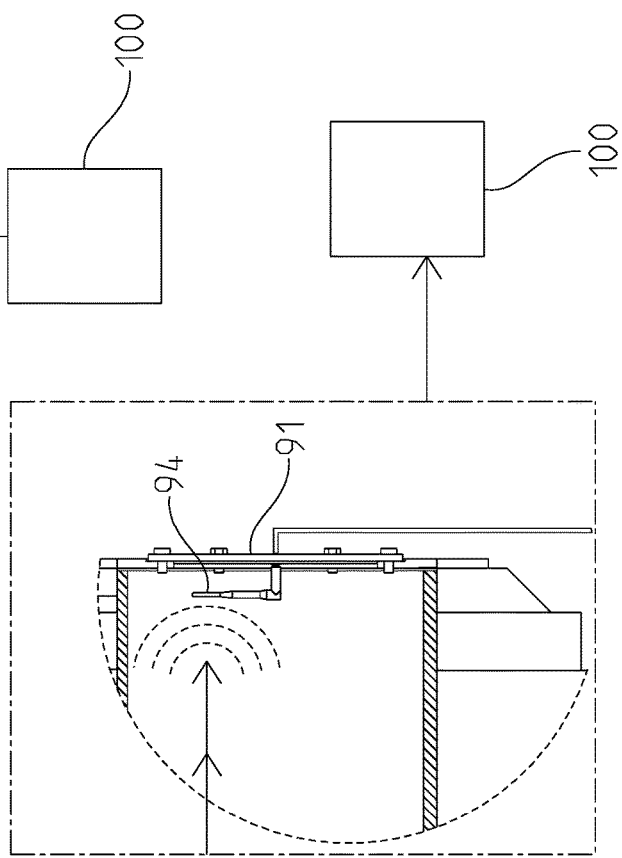
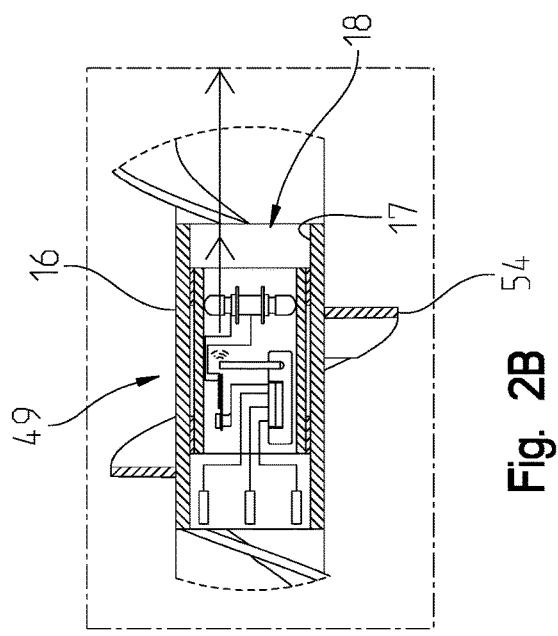
Fig. 2A
Fig. 2C
Fig. 2B

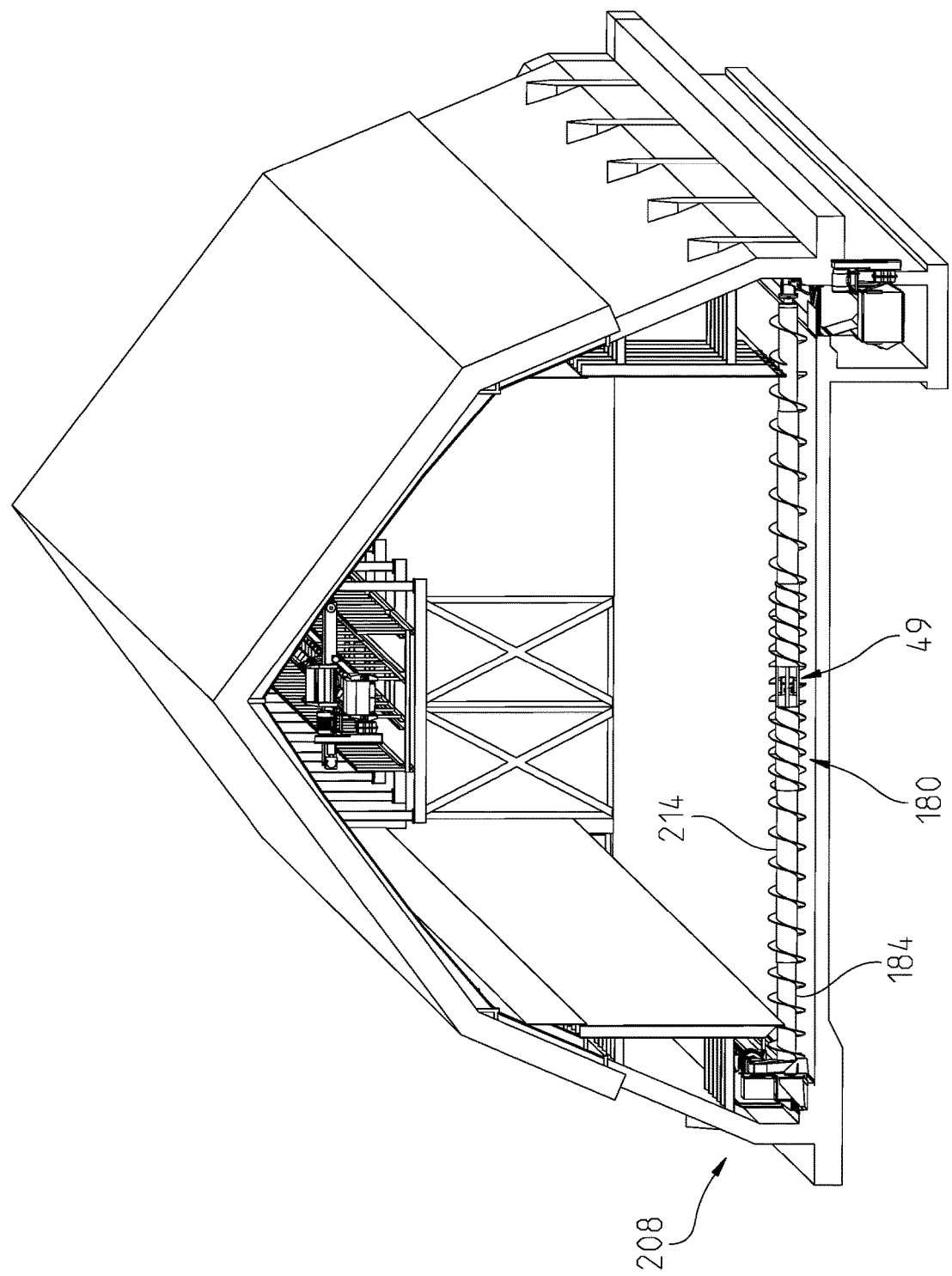

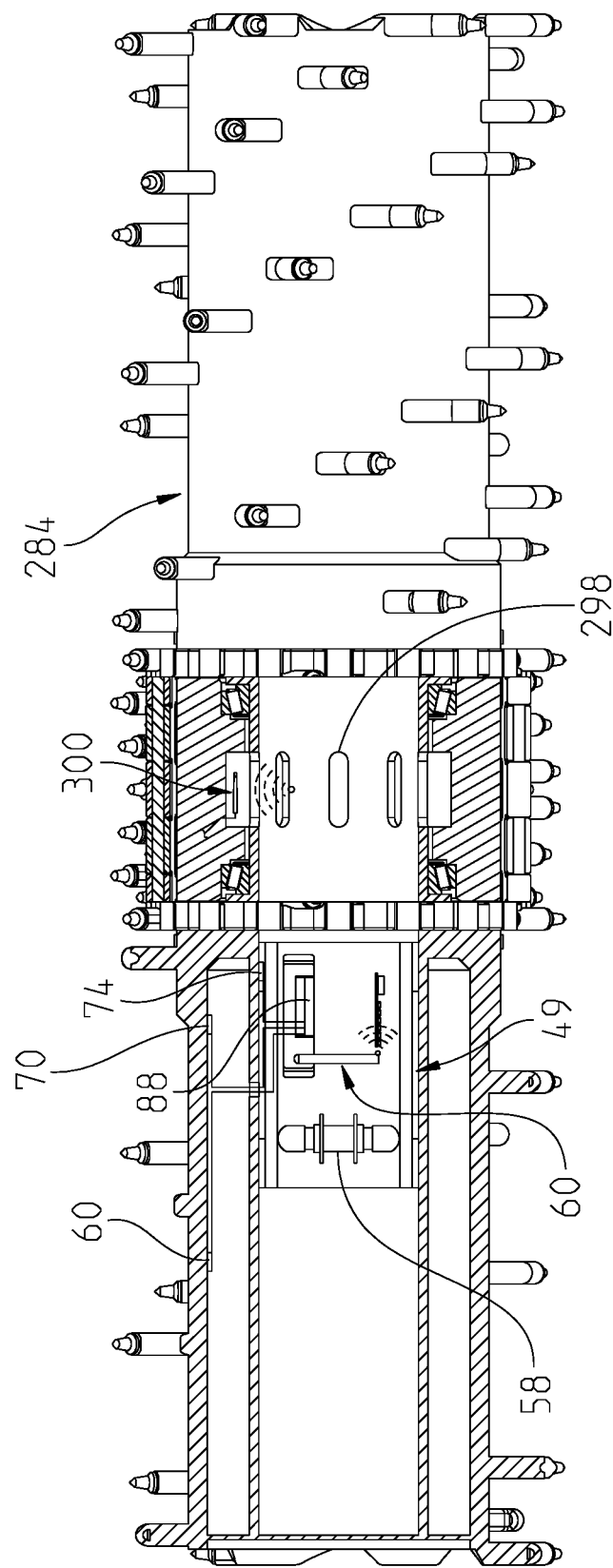

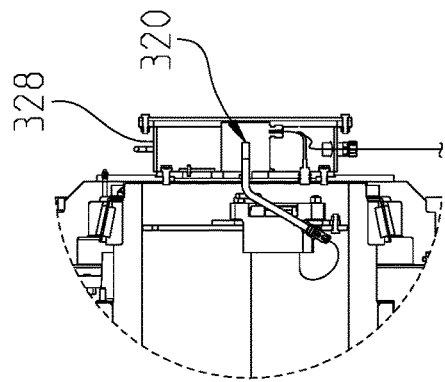
Fig. 21
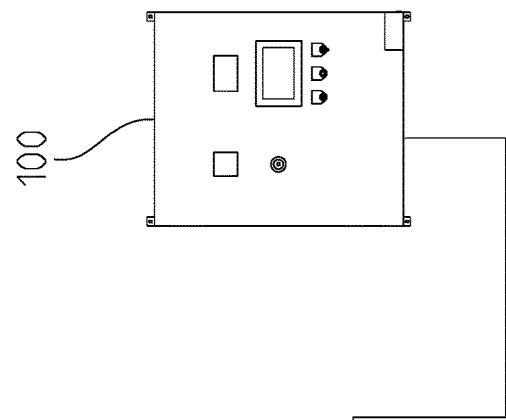
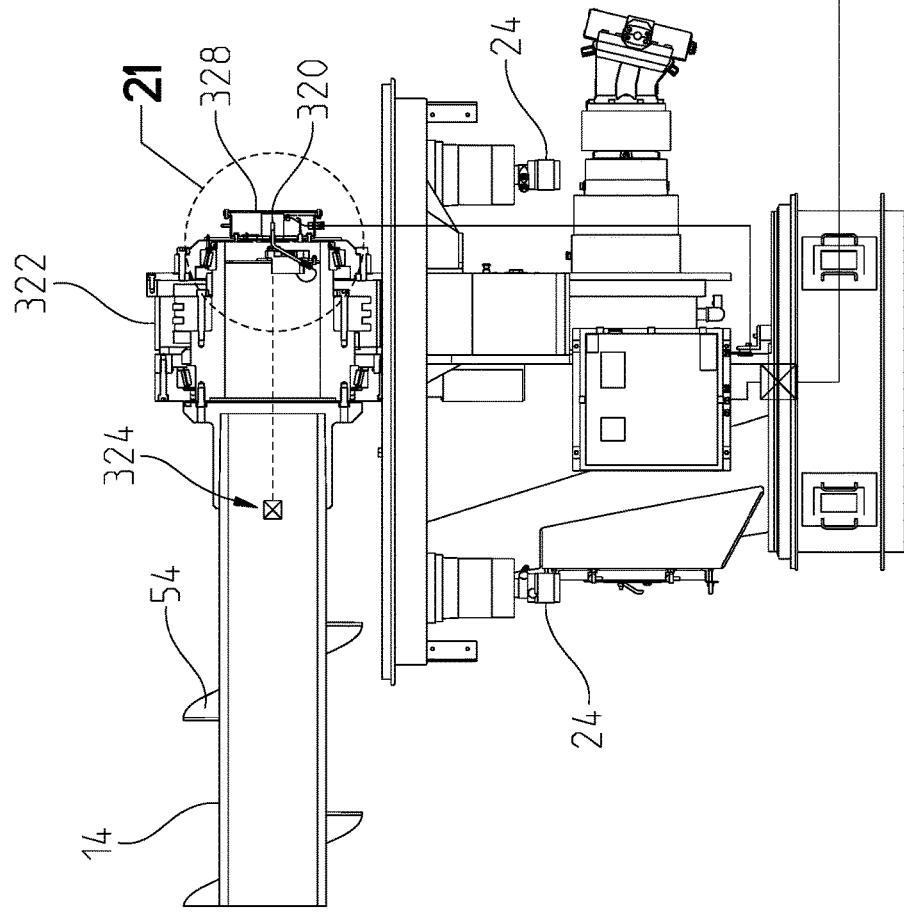
Fig. 20

INTERNAL MEASUREMENT FEEDBACK AUGER SYSTEM

BACKGROUND OF THE INVENTION

Auger systems are commonly used to move granular materials that are stored in piles. Such augers can be used to move piles of material located within various storage vessels (such as buildings, tanks, silos, or domes) or they can be used to move material stored in open piles that are not inside any storage building. The augers typically include a hollow shaft surrounded by flights that convey material in an axial direction along the auger as it is rotated about its central axis. In addition to rotating about its axis, an auger is advanced laterally into a pile of material that rests upon the auger. There are two basic types of unloading auger systems that are defined by how their lateral movement through the pile of material takes place:

1) augers that rotate in a circular fashion through a pile and convey the stored material to a center point and into a secondary conveyor outside of the pile.

2) augers that move linearly through a pile to convey the stored material to a secondary conveyor outside of the pile.

The loads that the auger and its mechanical drive system experience are dependent upon numerous factors, including but not limited to the height and size of the storage vessel, the depth of the stored material, the characteristics of the stored material, the temperature and humidity of the storage environment, the design of the auger system, the speed of auger rotation and the rate of auger advancement into the stored material. The loads placed on an auger and its drive system lead to stress within them.

As the auger advances into the pile, the auger can bow or deflect as a result of forces that act laterally on the auger. Furthermore, some materials cause the auger to want to climb onto the pile, providing another source for deflection of the auger. The forces from rotating a deflected auger can cause metal fatigue and bearing wear, both of which can result in failure of the auger system. Applying a lateral force to advance an auger into a pile causes cyclical forces as the auger rotates about its axis. Cyclical forces can exacerbate metal fatigue that eventually results in fractures or breakage of the auger tube. Bearing wear can eventually result in excessive bearing temperature leading to bearing failure and subsequent auger failure.

Either bearing failure or auger failure can also occur as a result of excessive torque or thrust loads in response to the auger advancing into the material pile and conveying material from that pile. Auger vibration is another factor which can lead to premature auger failure.

To operate an auger system in an optimally efficient manner, the auger rotational speed and the auger advancement rate into the material pile should be controlled to keep auger parameters such as deflection, torque, thrust, vibration and temperature limited to within an acceptable range. Each of these parameters can cause stress on the auger that may cause it to fail prematurely.

Traditionally, estimating auger parameters to keep them within acceptable levels has been limited to indirect measurements. Loads placed on an auger can be estimated indirectly by monitoring the current drawn through the electrically-powered auger-drive systems or through monitoring the hydraulic pressure on hydraulically-powered auger-drive systems. The auger rotation and advancement can be controlled through feedback from these indirect auger load measurements. However, these traditional methods of control are only marginally effective as they do not directly measure the actual auger deflection or auger stress. Additionally, indirectly measuring the aforementioned parameters can only provide an inaccurate estimate of stress and deflection, and even that is only possible when the construction of the auger is considered.

Prior to the method described here, direct measurement of auger parameters on an operating auger system has not been accomplished. Since the auger is rotating and also at least partially covered with material as it moves into and conveys material from the pile, taking real-time direct measurements of auger conditions has been problematic because of three factors: 1) the measurements would need to be taken from inside the rotating auger, 2) sufficient power would need to be supplied to the measurement apparatus located inside the rotating auger, and 3) the measurement results would need to be transmitted to a controller located outside the rotating auger. Taking measurements from inside the auger is difficult because the auger is typically made of metal which is conductive and therefore limits wireless transmission of data. Furthermore, since the typical auger rotation rate is between 10 and 200 rpm the use of electrical unions to transmit power and data is inherently problematic, especially since auger systems are commonly located in hazardous or explosive environments and any traditional revolving contact carries the risk of generating sparks.

The present invention solves these problems, making possible real-time direct measurements of auger parameters inside a rotating auger system. Measurable parameters include, but are not limited to, deflection, stress, torque load, thrust load, vibration and temperature. The measurements of these auger parameters are then transmitted to an auger control system which uses the measurements as feedback to alter the movement of the auger in order to maintain the auger parameters within a desired range and/or to notify the operator of auger conditions.

SUMMARY OF THE INVENTION

The present invention is an auger system having an auger with a shaft that has an outer diameter and an inner diameter. The auger has an inner chamber defined by the inner diameter. The outer diameter includes features for conveying material adjacent to the auger. The auger system has a measurement system that is contained within the inner chamber of the auger. The measurement system has a power source located within the auger. A sensor for measuring at least one condition within the auger is connected to the power source and a transmitter is powered by the power source to transmit a signal from the sensor. A receiver receives the signal from the transmitter and is spaced from the transmitter. The signal is then sent to a control system that compares the signal to a predetermined value to determine whether the condition measured is within an acceptable range. The control system may alter inputs into components for moving the auger until said condition is within an acceptable range.

BRIEF DESCRIPTION OF THE DRAWINGS

FIG. 2A is a side view of the auger in FIG. 1;

FIG. 2B is a sectional view of the auger in FIG. 2A;

FIG. 2C is a magnified sectional view of the receiver in FIG. 2A;

FIG. 14 is a linear auger system of the present invention;

FIG. 19 is a sectional view of the auger system shown in FIG. 18;

FIG. 20 is a sectional view of an auger system using slip rings to transmit signals from within the auger; and FIG. 21 is a magnified view of area 21 in FIG. 20.

DETAILED DESCRIPTION OF INVENTION

Figure 1:
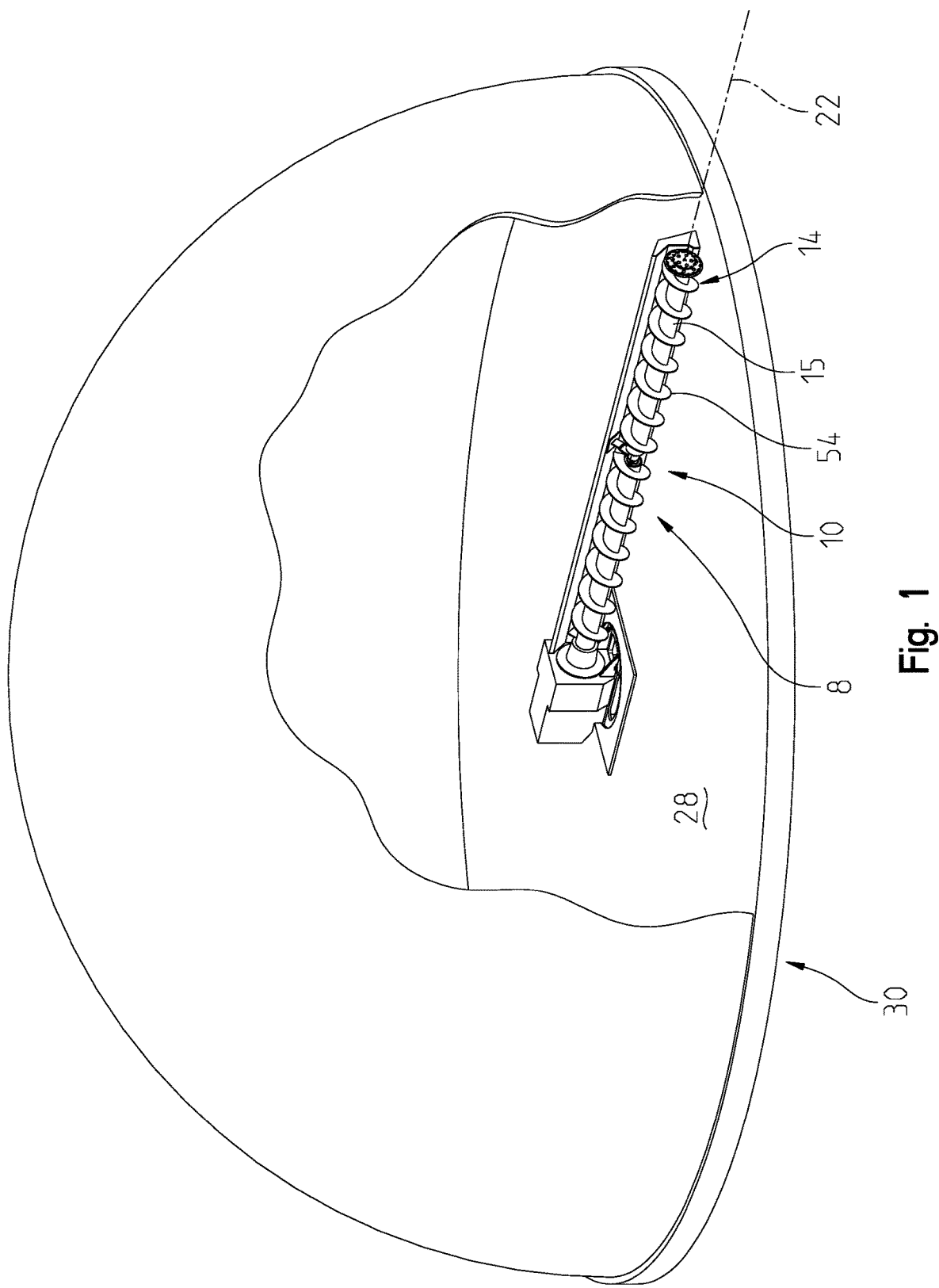
FIG. 1 is a perspective view of a center rotating auger in a storage structure.
Figure 3:
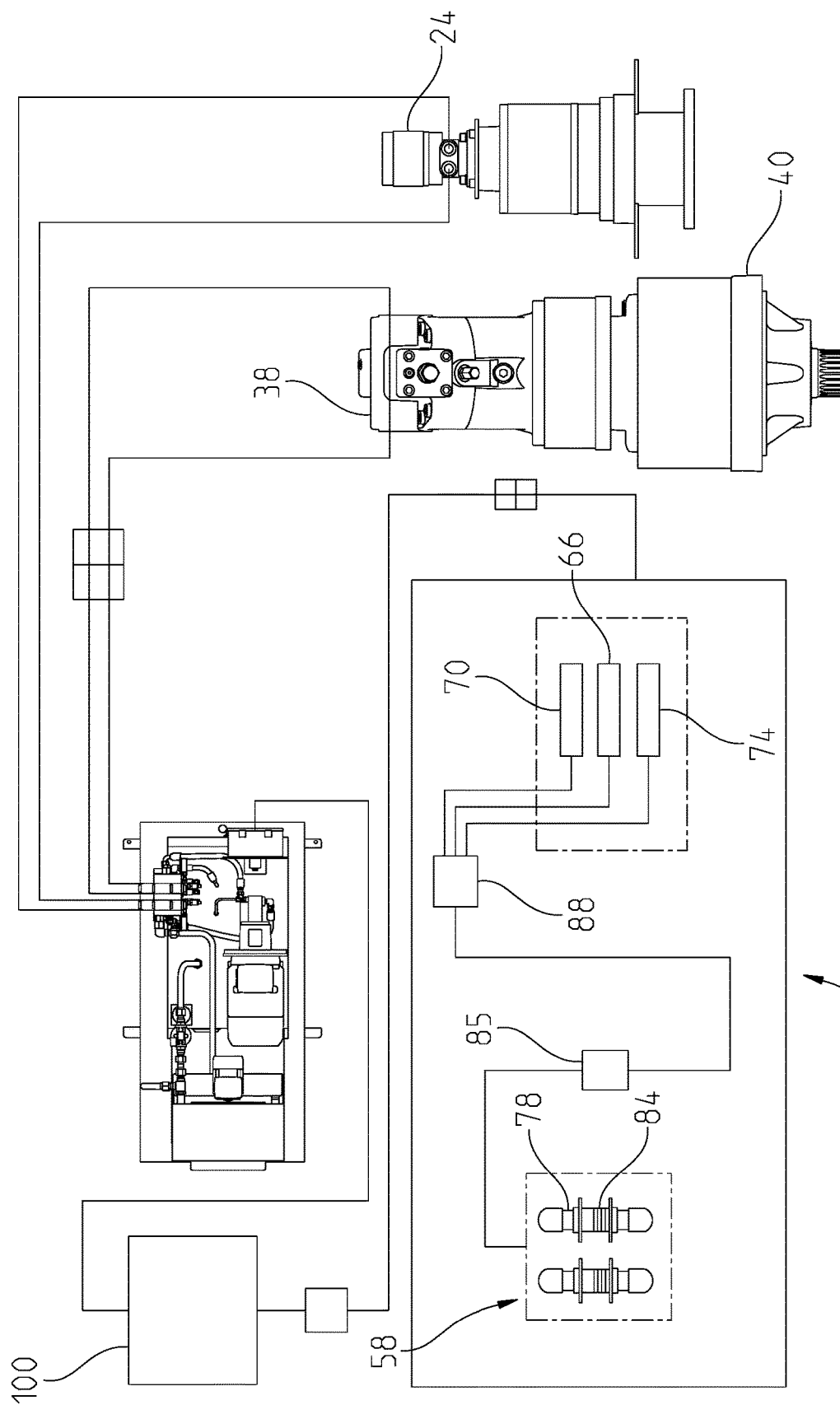
FIG. 3 is a schematic view of the components of the auger system in FIGS. 1-2C.
Figure 7:
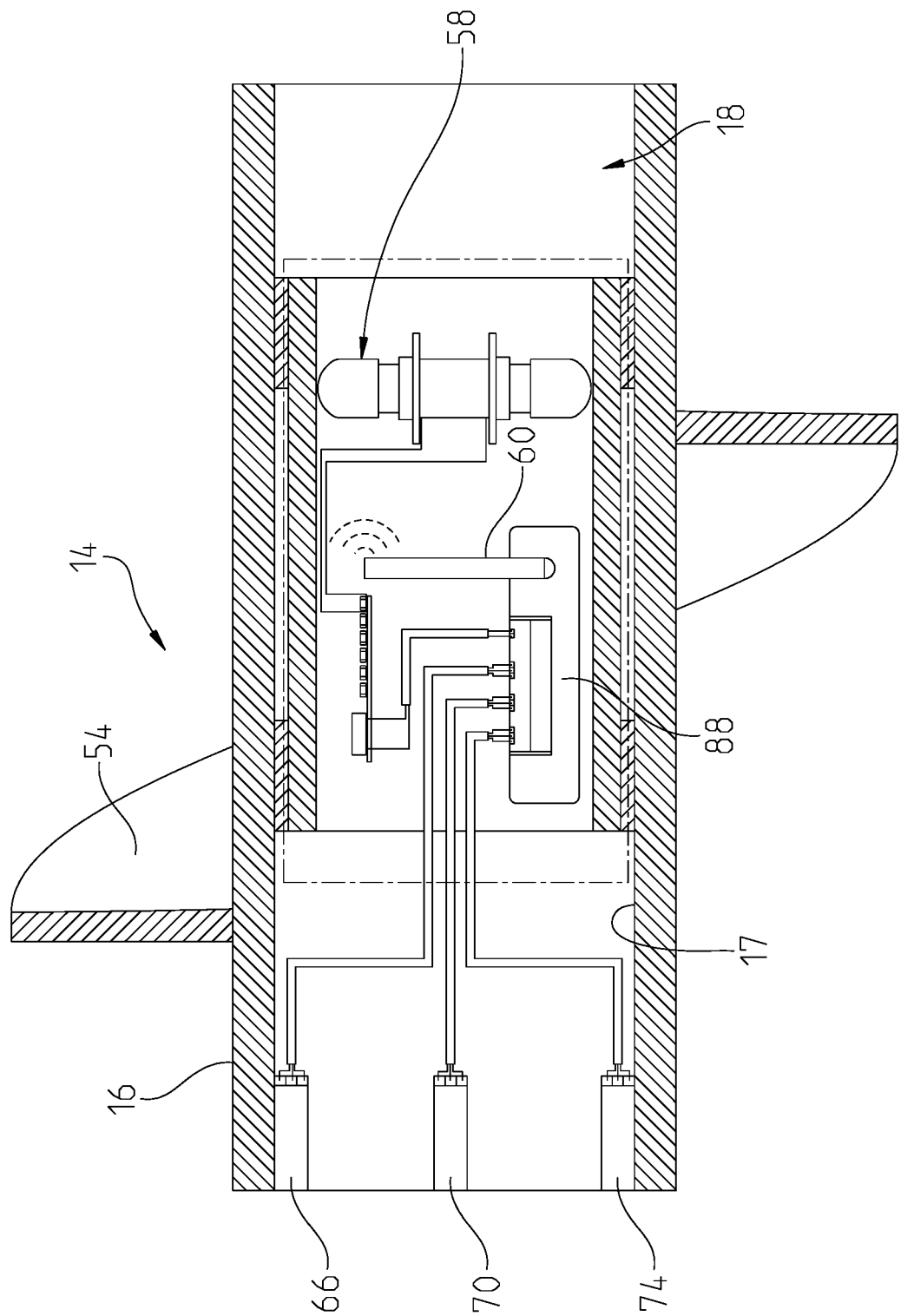
FIG. 7 is a sectional view showing the internal measurement system magnified from FIG. 6.
Figure 9:
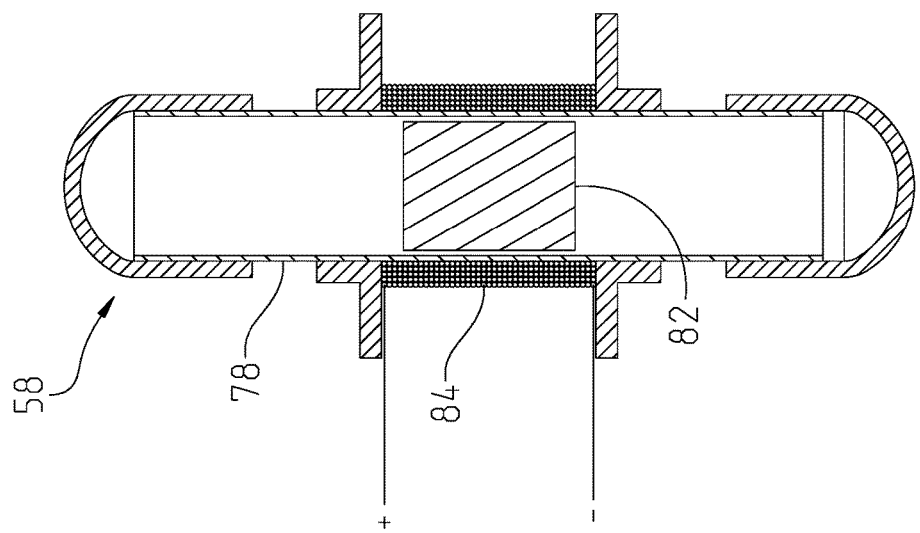
FIG. 9 is a sectional view of the power generator.
Figure 8:
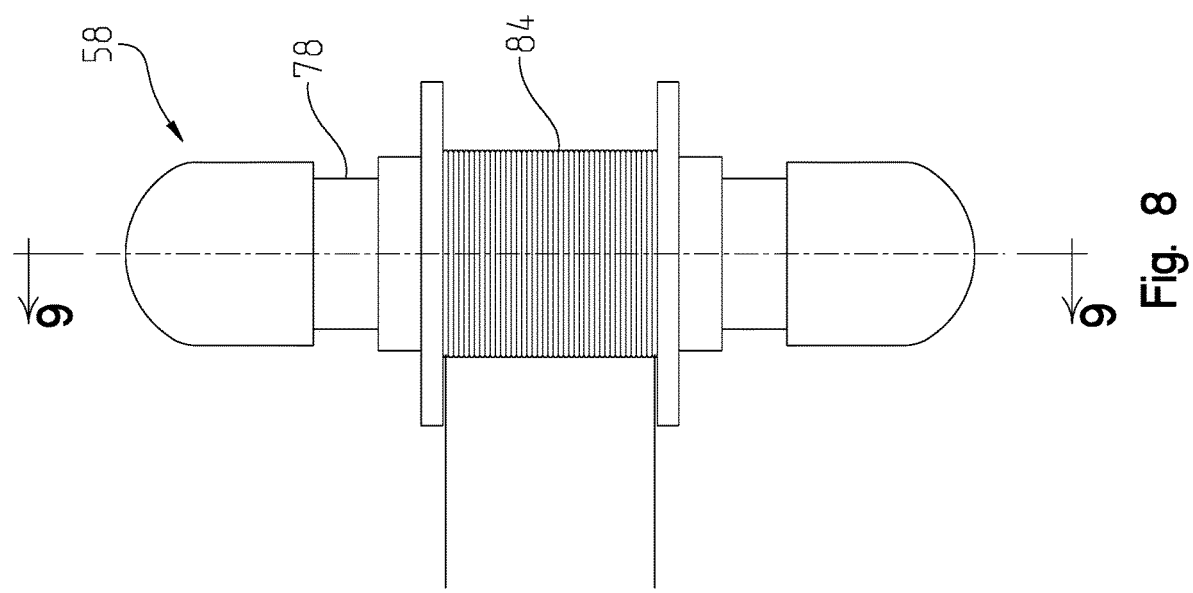
FIG. 8 is a side view of the power generator.

The internal measurement auger system 10 of the present invention may be used in several different types of augers that all have common features. A first type of auger system 8 is illustrated in FIG. 1 and has an auger 14 has a shaft 15 with an outer diameter 16 and an inner diameter 17. The inner diameter 17 defines a chamber 18. The auger 14 rotates about its central axis 22. Auger advance motors 24 advance the auger 14 by rotating the entire auger 14 laterally along a floor 28 of the storage structure 30 in which the auger 14 is located. The advance motors 24 rotate the auger 14 about a fixed center point within the center of the storage structure 30. FIG. 2 shows more detail about the auger system 10 shown in FIG. 1. An auger drive motor 38 rotates the auger 14 about its central axis through a gearbox 40. The drive motor 38 may be an electric or hydraulic motor. As shown in FIG. 2, the motor 38 is a hydraulic motor. The auger 14 has a proximal end 44 and a distal end 48 that is supported by a wheel 50. The wheel 50 supports the auger 14 above the floor 28 of the storage structure 30 but does not support it with respect to lateral loads. Helical flights 54 encircle the auger 14 and convey material axially along the auger 14 as it rotates about its axis 22. At a point within chamber 18, inside the auger 14, there is a measurement system 49. The measurement system 49 has an internal power generator 58, an antenna 60 and sensors 66, 70, 74. The internal power generator 58 is shown more thoroughly in FIGS. 7-9. The power generator 58 has a sealed tube 78 that contains a permanent magnet 82 that rides within the sealed tube 78. The tube 78 is surrounded by a coil 84. As the auger 14 rotates about its central axis 22, the magnet 82 falls through the coil 84 as gravity acts on it. As the magnet 82 falls through the coil 84 it generates electricity. In this manner, the power generator 58 is completely decoupled from any part of the auger system 10 so that there is no mechanical link to any part of the auger system 10 outside of the auger 14 itself. The power generator 58 uses its magnet 82 as a weight acted upon by gravity to produce power, and it is contemplated that a weight other than the magnet 82 itself may drive the power generator 58 to produce the necessary power for the measurement system 49 to function. The electricity from the power generator 58 may be passed through power conditioning equipment 85 such as voltage regulators and/or rechargeable batteries to provide stable and predictable power to the sensors 66, 70, 74 and to provide power to a wireless data transmitter 88. The sensors are an accelerometer 66, a thermocouple 70 and a strain gauge 74. These sensors 66, 70, 74 may be placed in appropriate locations along the length of the auger 14. Additionally, it may be desirable to place more than one of the sensors 66, 70, 74 along the length of the auger 14 to take data at various points along the auger 14. Each of the sensors 66, 70, 74 generates a signal that corresponds to values it measures within the chamber 18 of the auger 14. It is contemplated that a replaceable battery may be used in place of the power generator 58, however this is less desirable than using a power generator 58 because a battery would need periodic replacement and may contain chemicals that could potentially leach out into the auger or the stored material. Having the measurement system 49 completely contained within the chamber 18 inside the auger 14 protects it from damage and allows it to function for an extended period of time without maintenance.

Figure 10:
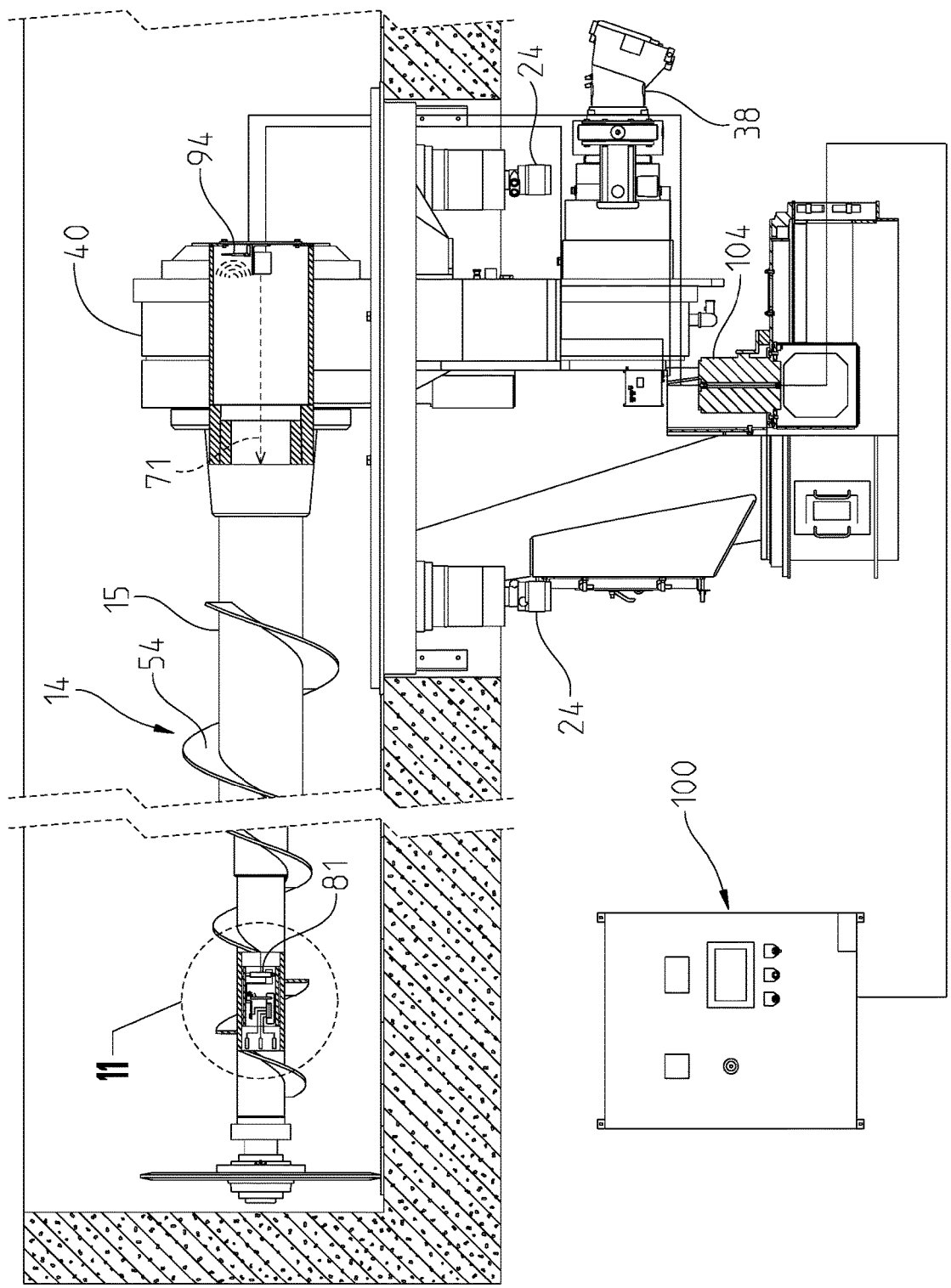
FIG. 10 is a sectional view of a center rotating auger system of the present invention.
Figure 11:
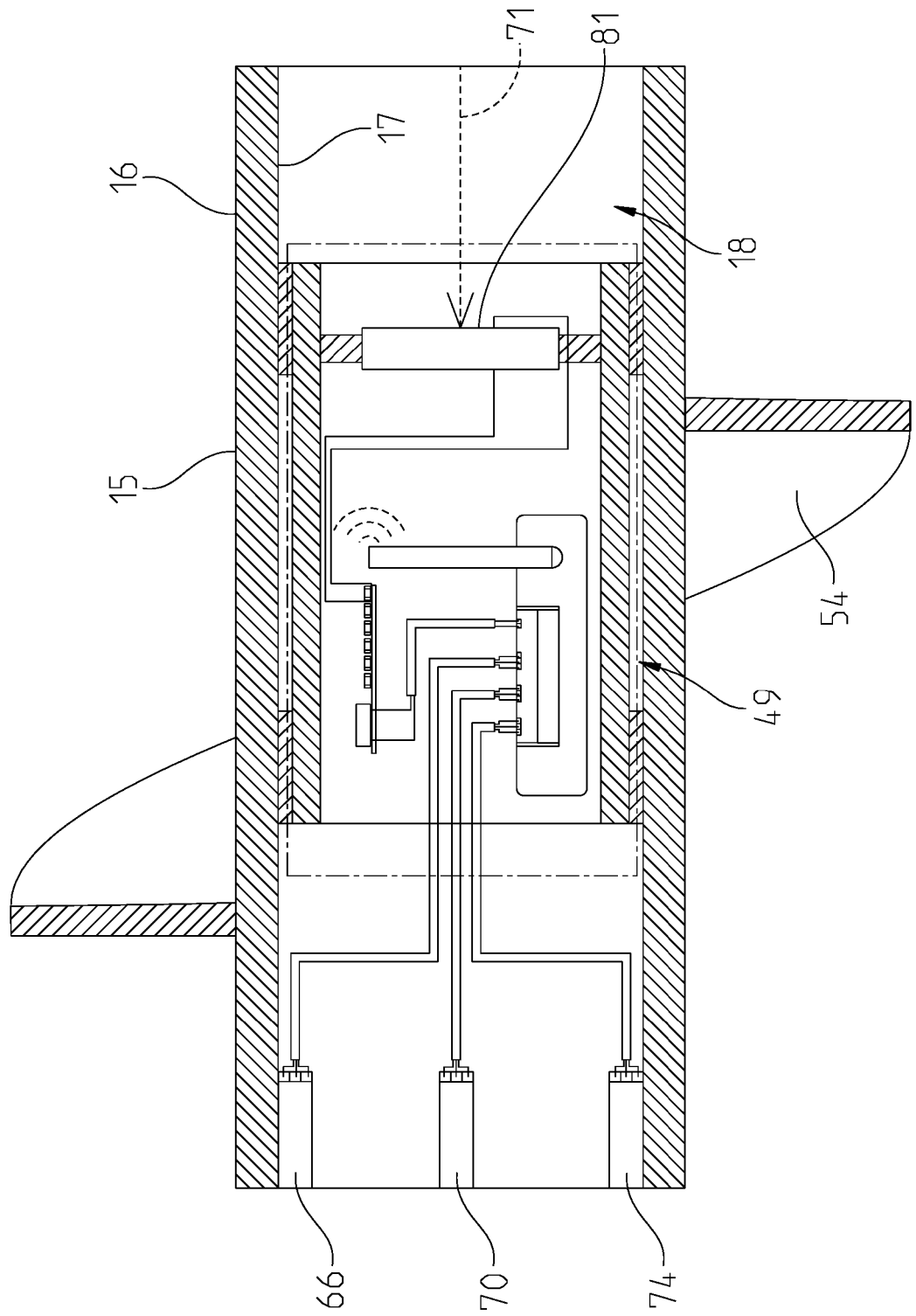
FIG. 11 is a magnified sectional view of the measurement system in FIG. 10.

An alternate method of internal power generation which uses a focused light source, such as a laser, together with a photovoltaic detector is shown FIGS. 10-11. In this method, power generator 58 is replaced with a focused light beam 71 which illuminates photovoltaic detector 81. The current generated by detector 81 is processed in the power management circuit and used to power the sensors 66, 70 & 74.

Figure 13A:
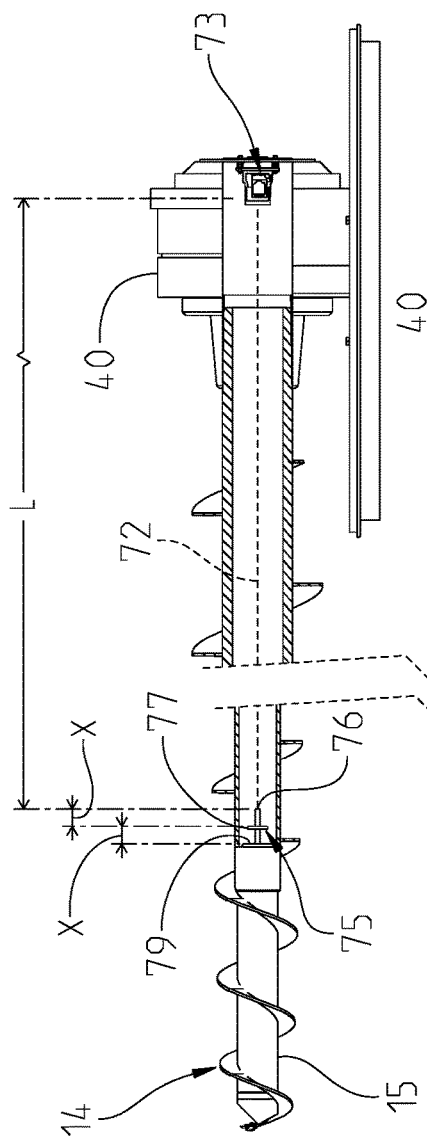
FIG. 13A is an undeflected sectional view of the auger system shown in FIG. 12.
Figure 13B:
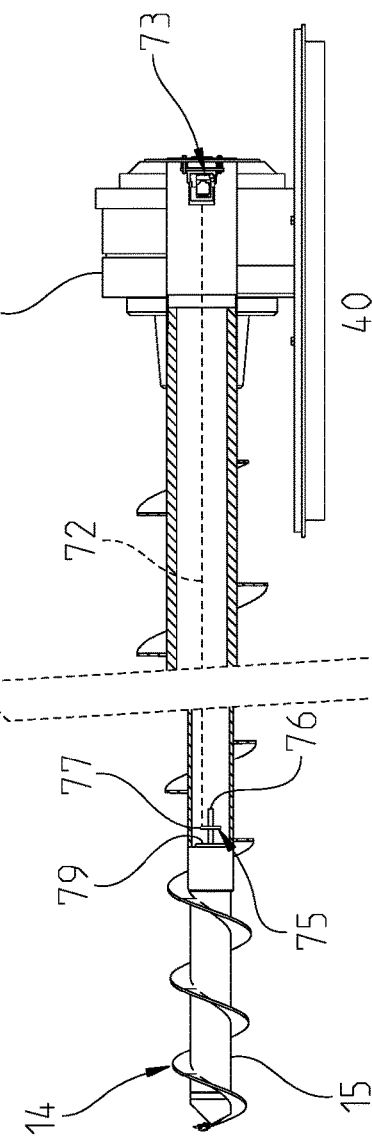
FIG. 13B is a slightly deflected auger system as shown in FIG. 13A.
Figure 13C:
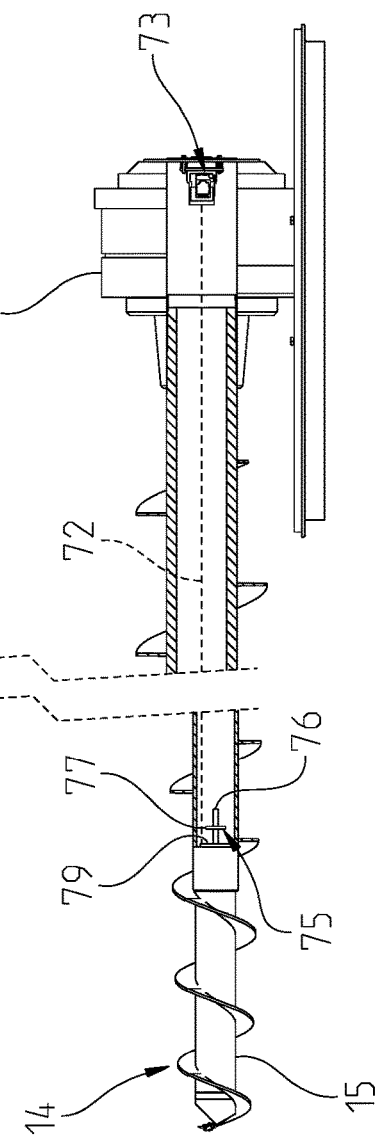
FIG. 13C is an auger system as shown in FIGS. 13A and 13B.

In some instances, it may be desirable to measure overall deflection along a predetermined length of the auger 14. A method of directly measuring the deflection along auger 14 is shown in FIG. 12 and FIG. 13A-C. A laser and detector unit 73 that can produce a laser beam 72 and detect the reflected laser beam 72 is located near the gear box 40. The laser and detector unit 73 shines the laser beam 72 on a concentrically tiered reflector 75. The concentrically tiered reflector 75 includes a first reflective surface 76 that is aligned with the central axis 22 of the auger 14. A second reflective surface 77 is located farther from the laser and detector unit 73 than the first reflective surface 76. A third reflective surface 79 is located farther from the laser and detector unit 73 than the second reflective surface. When the auger 14 is in its undeflected state, that corresponds to having no net load placed up on it, the laser beam will strike the first reflective surface 76 and the detector unit 73 will be able to determine the measured distance corresponding to the laser beam 72 striking the first reflective surface 76 as shown in FIG. 13A. As the auger 14 deflects, it is bent so that the laser beam 72 strikes the second reflective surface 77 (as shown in FIG. 13B) and the detector unit 73 determines that the auger 14 has bent enough for the laser beam 72 to strike the second reflective surface 77 by calculating the corresponding distance. As the auger 14 is bent still further, the detector unit 73 determines the laser beam has struck the third reflective surface 79 as shown in FIG. 13C. Upon determining the corresponding deflection, the laser and detector unit 73 is able to send a signal corresponding to the deflection. Each successive reflective surface 76, 77, 79 extends radially outward of the nearer reflective surface so that deflection may be calculated based on which reflective surface 76, 77, 79 the laser beam strikes.

Figure 11B:
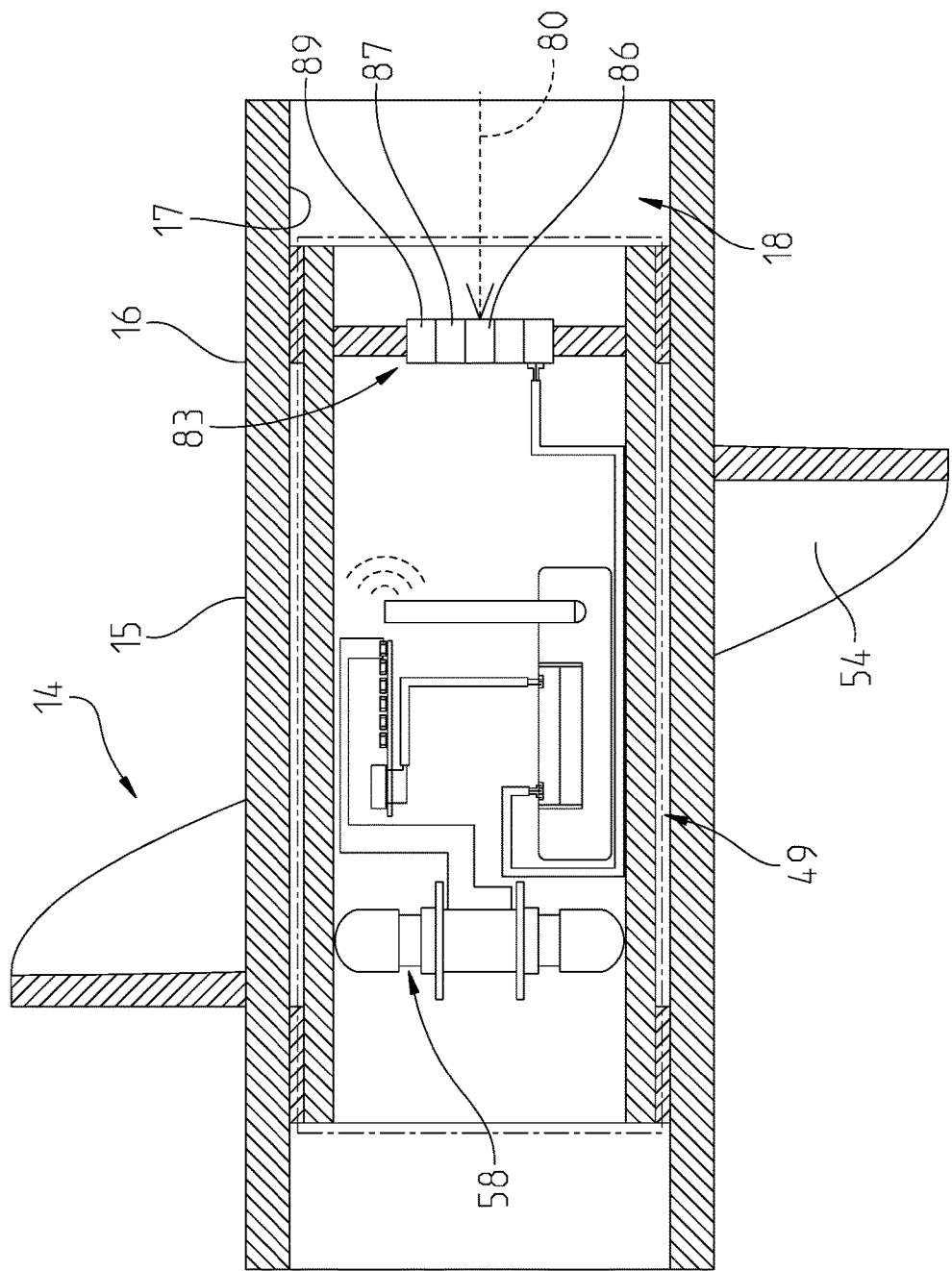
FIG. 11B is a sectional view of a measurement system using a beam of light to measure deflection.
Figure 12:
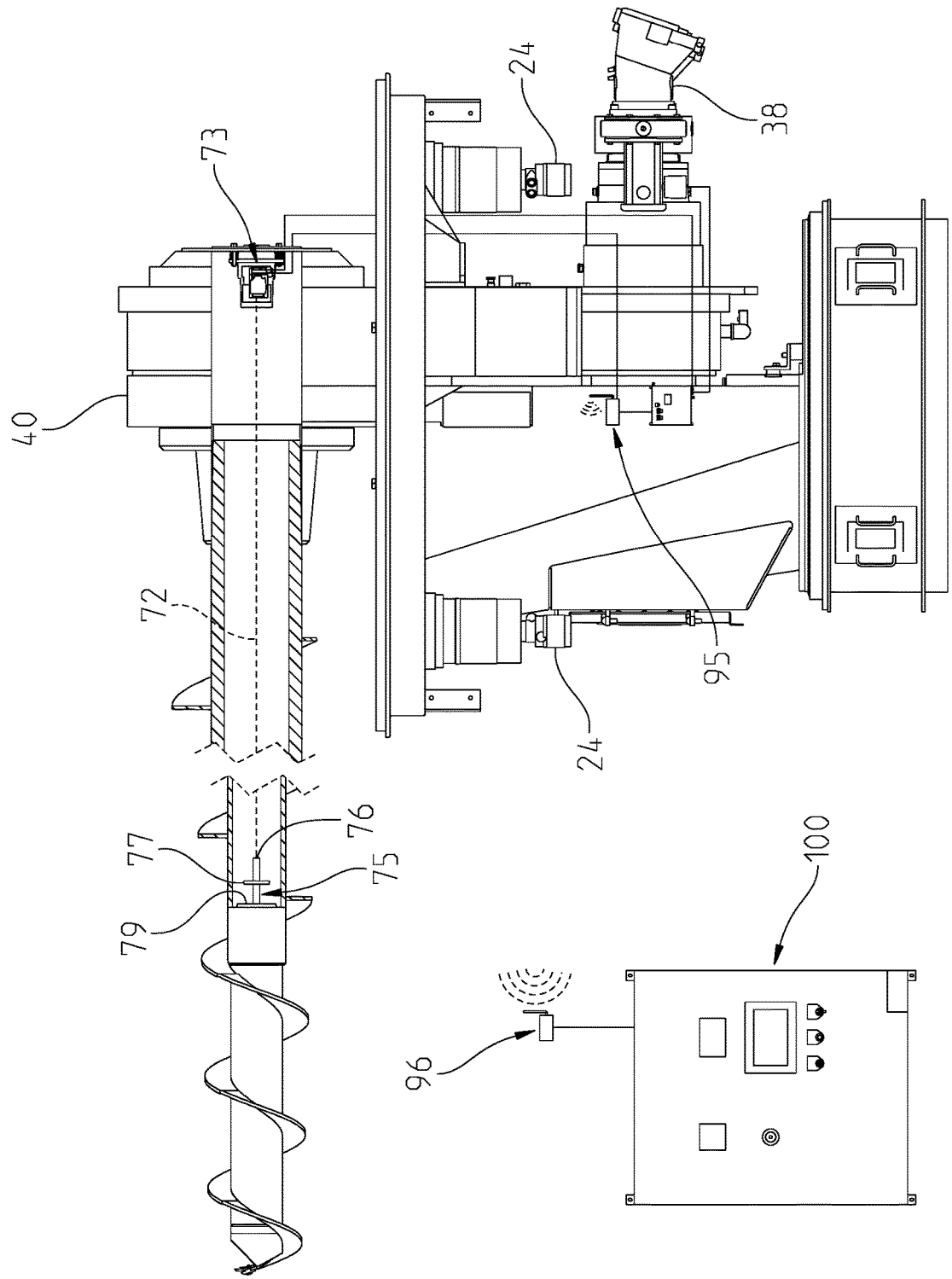
FIG. 12 is a sectional view of a center rotating auger system using a reflective measurement system.

FIG. 11B shows a method for measuring auger deflection with photovoltaic detectors. In this case, a focused light beam 80, which may be a laser beam, strikes a photovoltaic detector array 83, typically consisting of concentric photovoltaic detectors 86, 87, 89 that send a signal according to the location where the light beam 80 strikes each individual photovoltaic detector 86, 87, 89 within the photovoltaic detector array 83. Larger deflection in the auger 14 will correspond to the light beam 80 striking the photovoltaic detector array 83 more radially outward.

Within the internal measurement system 49 that includes the power generator 58 wireless data transmitter 88 and sensors 66, 70, 74, there are no contacts that can cause sparks because there is no frictional contact having relative movement with respect to another contact as would occur in rotating unions or brushes. The wireless data transmitter 88 can send data down the length of the auger 14 by emitting a radio frequency, but may have difficulty sending data through straight through the metal sidewall 90 of the auger 14. It is not necessary that the signal from the wireless data transmitter 88 be sent through the sidewall 90 because that data sent down the length of the auger 14 is detected by a receiver antenna 94 that may be placed in a location that does not rotate such as the fixed end plate 91 that shown in FIG. 2. This separation of the receiver antenna 94 and the wireless data transmitter 88 provides a physically decoupled connection that is not susceptible to damage from the stored material and will not generate sparks. The transmitter 88 and receiver antenna 94 do not make contact. The end plate 91 acts a receiver base that is fixed from rotation with respect to the auger 14. It is contemplated that other locations than the end plate 91 may act as a receiver base as long as that location for the receiver antenna 94 allows the receiver antenna 94 to receive signals within the auger. The location of the receiver antenna 94 need only provide a means for receiving the signal from the transmitter 88.

Figure 4:
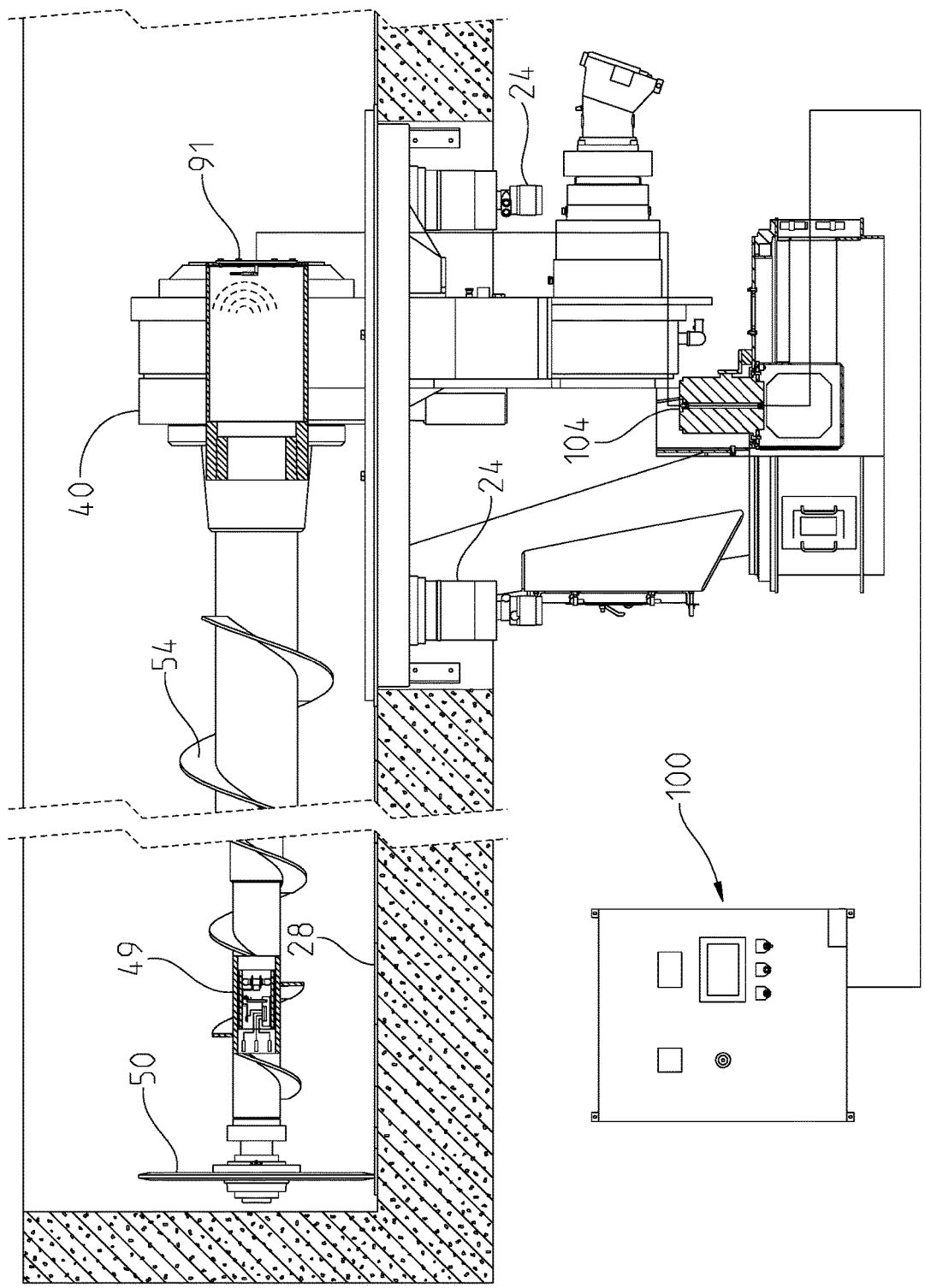
FIG. 4 is a sectional view of a center rotating auger system of the present invention.
Figure 5:
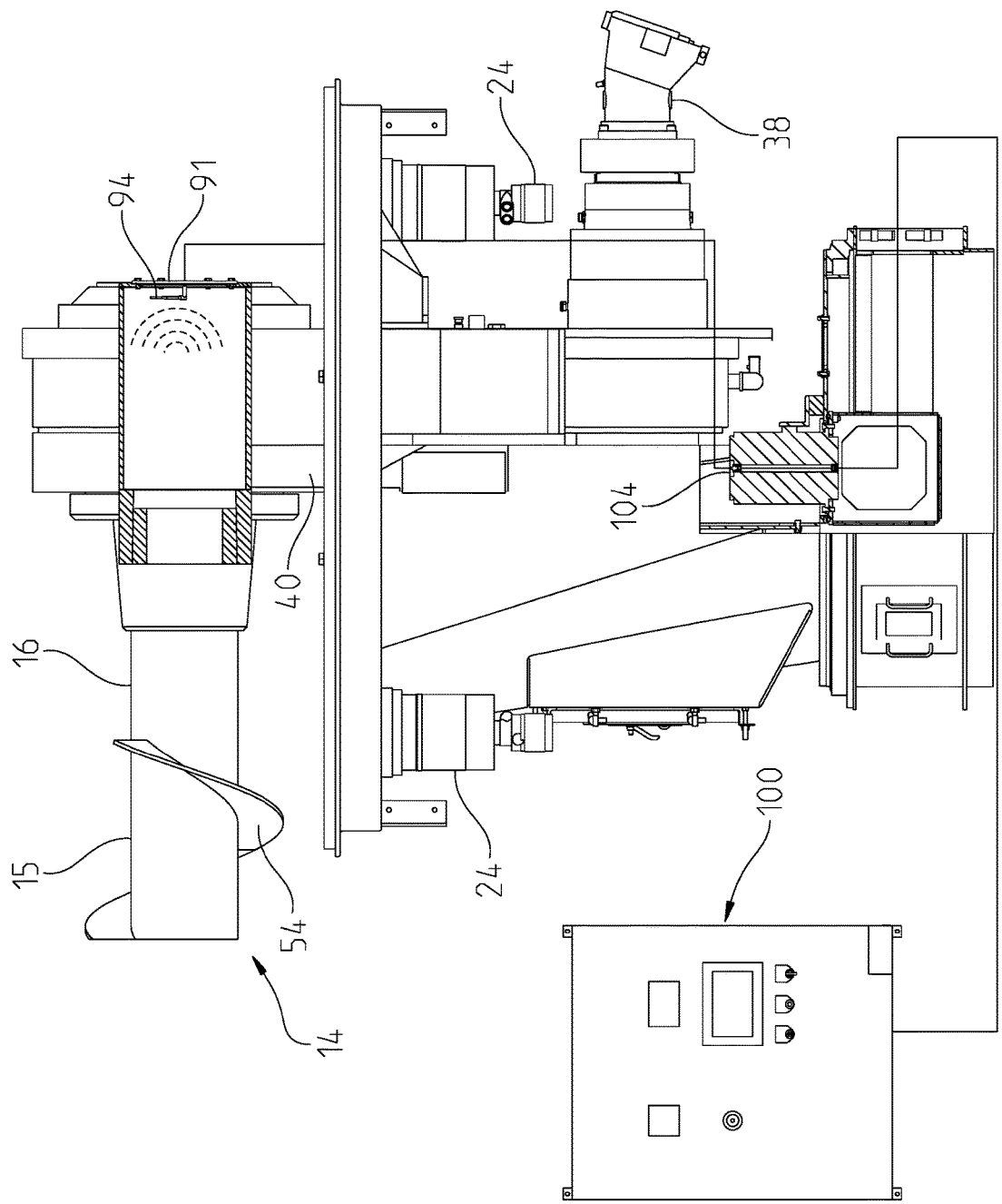
FIG. 5 is an enlarged version of the rotating auger shown in FIG. 4.
Figure 6:
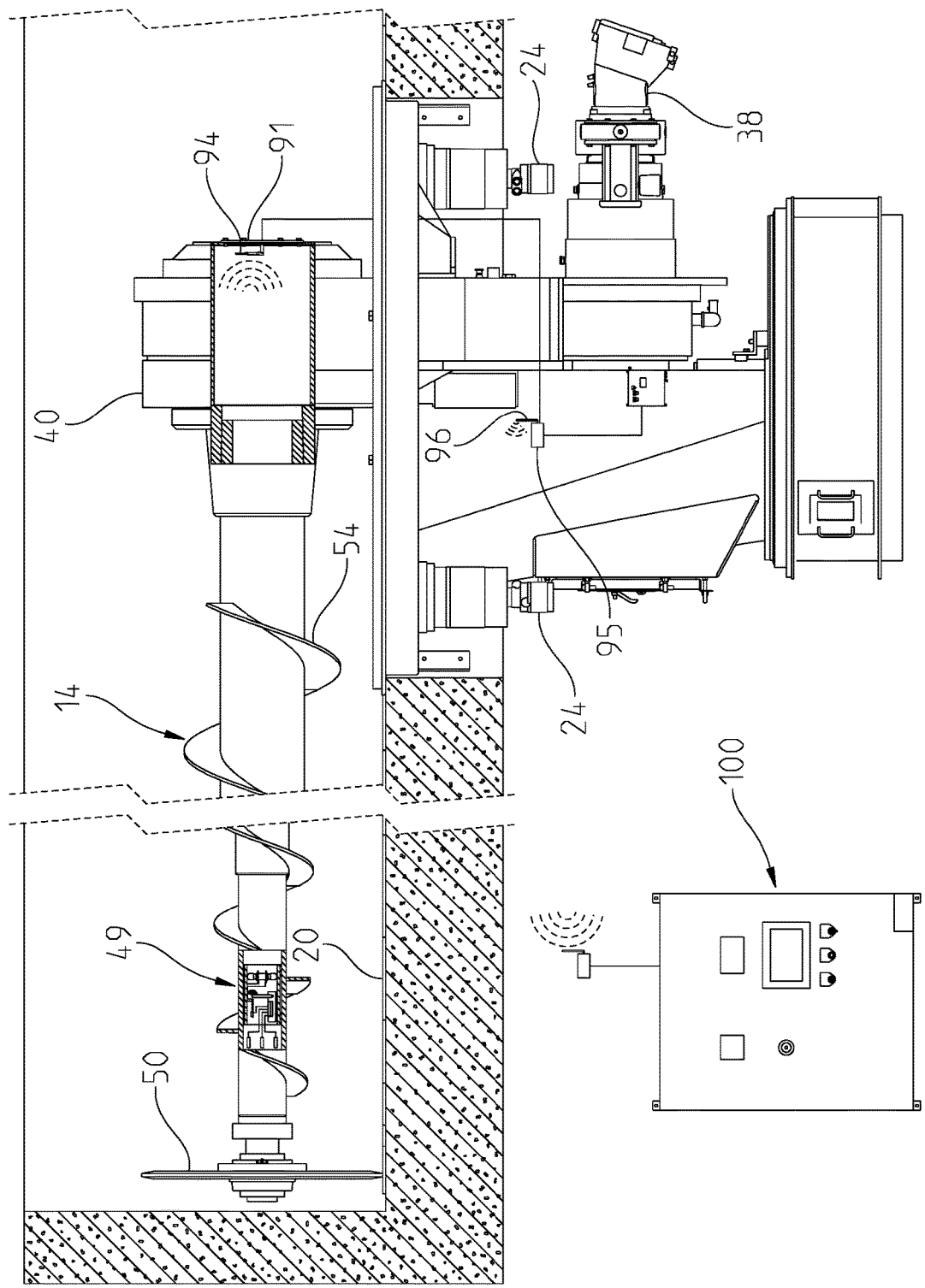
FIG. 6 is a sectional view of a rotating auger system of the present invention.

The data signal from the receiving antenna 94 must be transmitted out of the auger 14 and into a feedback control system 100. This may be done by using a wireless repeater 95 that acts as a second transmitter directed to a receiver 96 as shown in FIG. 6 or a rotating electrical union 104 that is located outside of the storage structure 30 and away from any potentially explosive dust from the stored material as shown in FIG. 4. This allows the auger 14 and gearbox 40 to rotate with respect to the electrical union 104 as the advance motors 24 that rotate the auger 14 laterally about its fixed center within the storage structure 30. The rotation rate of this electrical union is extremely slow, since it rotates at the same rate in which the auger cycles around the floor of the storage structure. Typically, this rotation rate is on the order of 1 cycle every 10 hours or more, so there is minimal risk of spark.

The feedback control system 100 receives signals from the sensors 66, 70, 73, 74, 81 as described above. The control system 100 may use information from the signals to change inputs to the components that move the auger 14 such as the auger advance motor(s) 24, and auger drive motor 38 so that the auger 14 is not subjected to loading that would cause damage to it or the storage structure 30. The feedback control system 100 contains predetermined values that correspond to operating parameters that are acceptable for the auger 14 to operate under. For instance, the feedback control system 100 will have predetermined values for acceptable ranges of temperature, acceleration of the auger 14, strain within the auger 14, and/or deflection of the auger 14. The feedback control system 100 receives signals from the respective sensors 66, 70, 73, 81 and compares the value that each signal represents to one of the predetermined values it contains with respect to particular operating parameters. If the feedback control system 100 compares the value corresponding to a particular signal and that signal corresponds to a value condition outside of an acceptable range of operating conditions, the feedback control system 100 will alter inputs to the auger system 10 until the auger 14 is operated in a manner that puts the particular value or values measured by the sensors 66, 70, 73, 81 within the predetermined values or ranges of values so the auger 14 is not damaged. The inputs to the auger system 10 that the feedback control system 100 can alter include the inputs to the components that drive the auger 14 such as the auger advance motor 24 and the drive motor 38. Depending on the types of motors 24, 38 used, the feedback control system 100 may alter electrical or hydraulic power to these motors 24, 38 to achieve the desired conditions within the auger 14.

Figure 15:
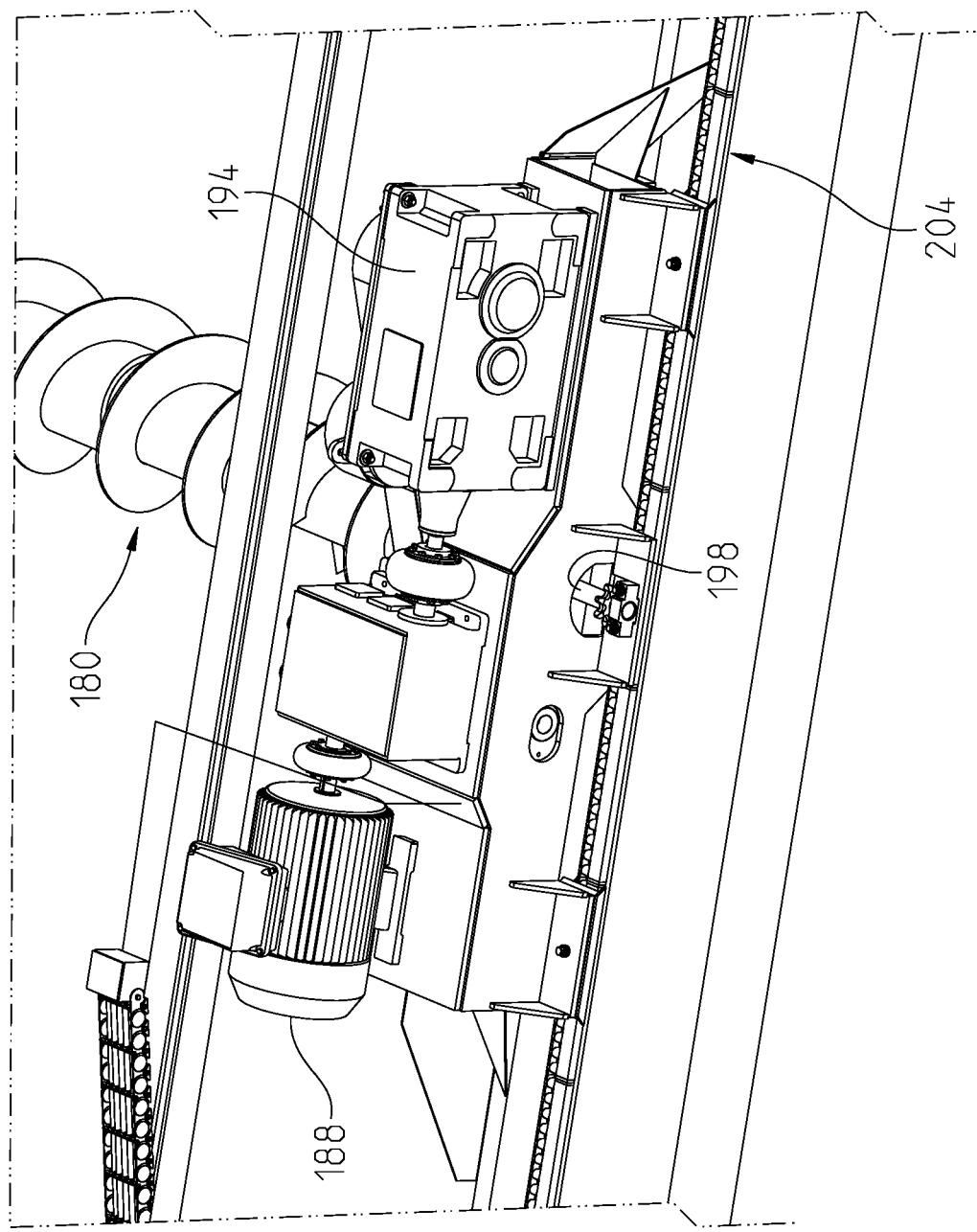
FIG. 15 is a magnified view of the carriage assembly of the linear auger system shown in FIG. 14.

FIGS. 14 and 15 illustrate a linear auger 180 that has a proximal end 184 that is near auger drive motor 188 connected to a gearbox 194 that rotates auger 180. The auger advance motor (not shown, located inside carriage 204) drives an auger advance shaft 198. The auger advance shaft 198 drives the carriage 204 and advances the auger 180 laterally through the pile within the storage structure 208. In this case, the proximal end 184 is on the left hand side as shown in FIG. 14. As such, a distal portion 214 of the auger 180 is located at some distance away from the proximal end 184 and may be deflected as the auger 180 is advanced through stored material because the distal portion 214 is not supported to the extent that the proximal end 184 is supported. As shown in FIG. 14, the internal measurement system 49 is located at some point inside of the auger 180. In the same manner as described above, the data taken from the auger 180 is processed by a feedback control system 100 that ensures that the auger 180 is advanced and rotated at appropriate rates to prevent damage to the auger 180. In this case a receiving antenna (not shown) is attached to an endplate fixed to carriage 204 and mounted so as to protrude inside auger 180. The receiving antenna receives a radio signal from the measurement system 49 located within the auger 180 in the same manner as show in FIGS. 1-11.

Figure 16:
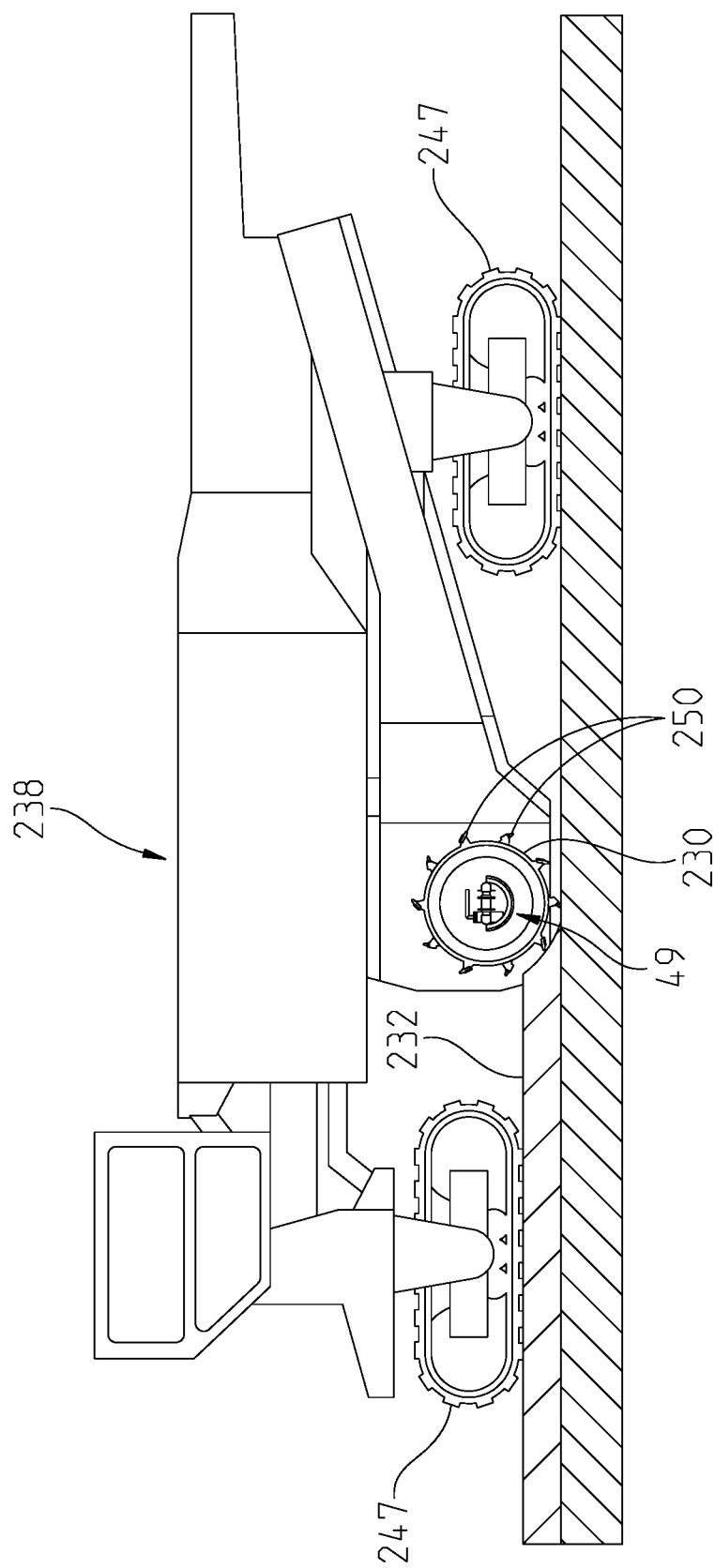
FIG. 16 is a side view of the auger system of the present invention as used in a mining machine.
Figure 17:
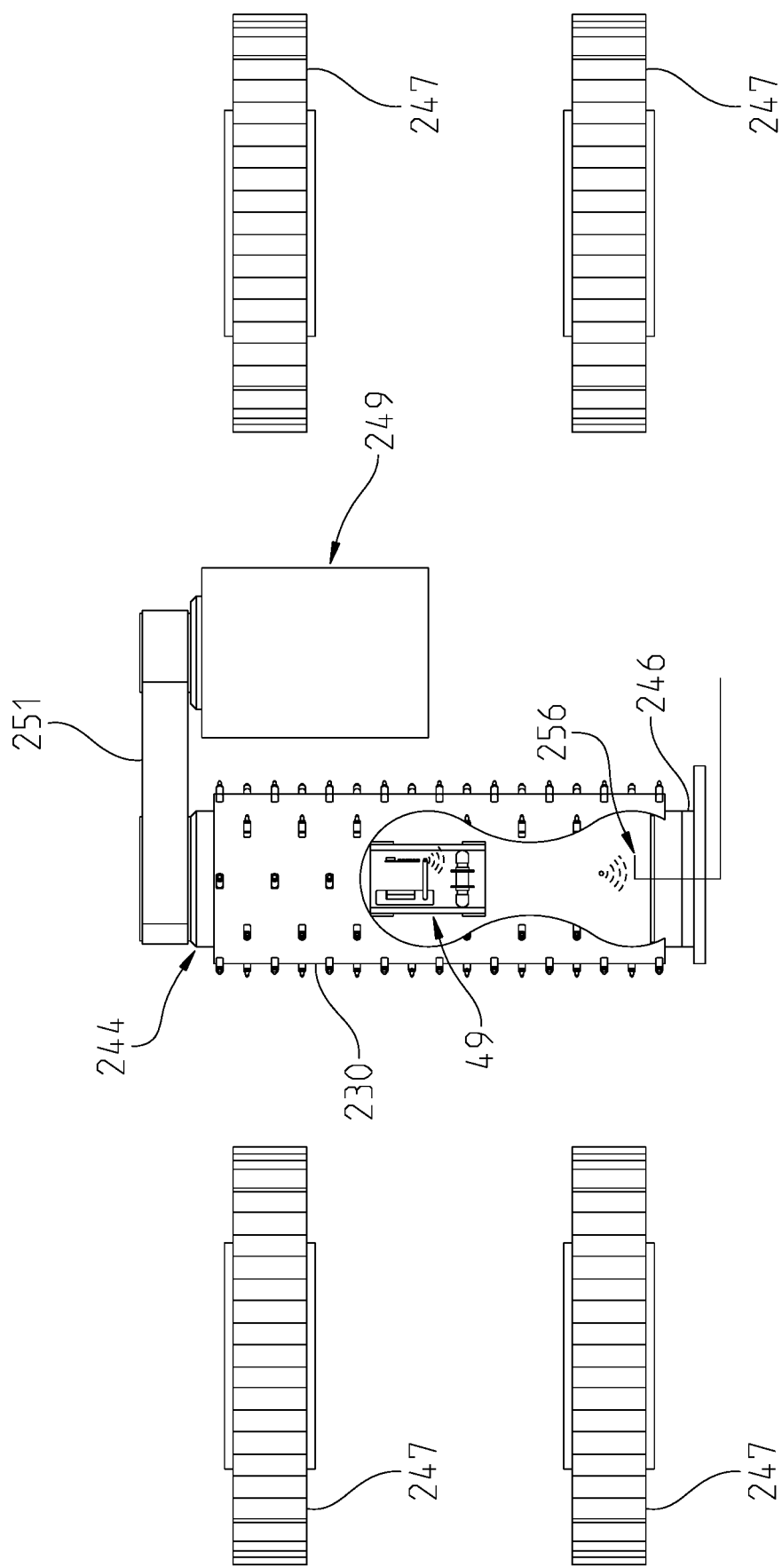
FIG. 17 is a top view of the auger system of FIG. 16.

FIGS. 16 and 17 illustrate a drum 230 that conveys cut material 232 into a mining machine 238. The drum 230 rotates between a transmission 244 and a bearing plate 246. Carbide teeth 250 extend from the drum 230 to cut into the material in the path of the drum 230 and convey the material into the mining machine 238. The drum contains the internal measurement system 49 as described above and transmits data taken to an antenna 256 fixed with respect to the bearing end plate 246. In the mining machine 238 the auger advance motor (not shown) is contained within the body of the mining machine 238 and advances the drum 230 through movement of crawler tracks 247. A drive motor 249 is connected with a belt 251 to the drum 230 and through the transmission 244 rotates the drum 230 about its axis in the same manner as auger 14 is rotated. As discussed above, the measurements can be used to change the operation of the drum 230 or any other component of the mining machine 238.

Figure 18:
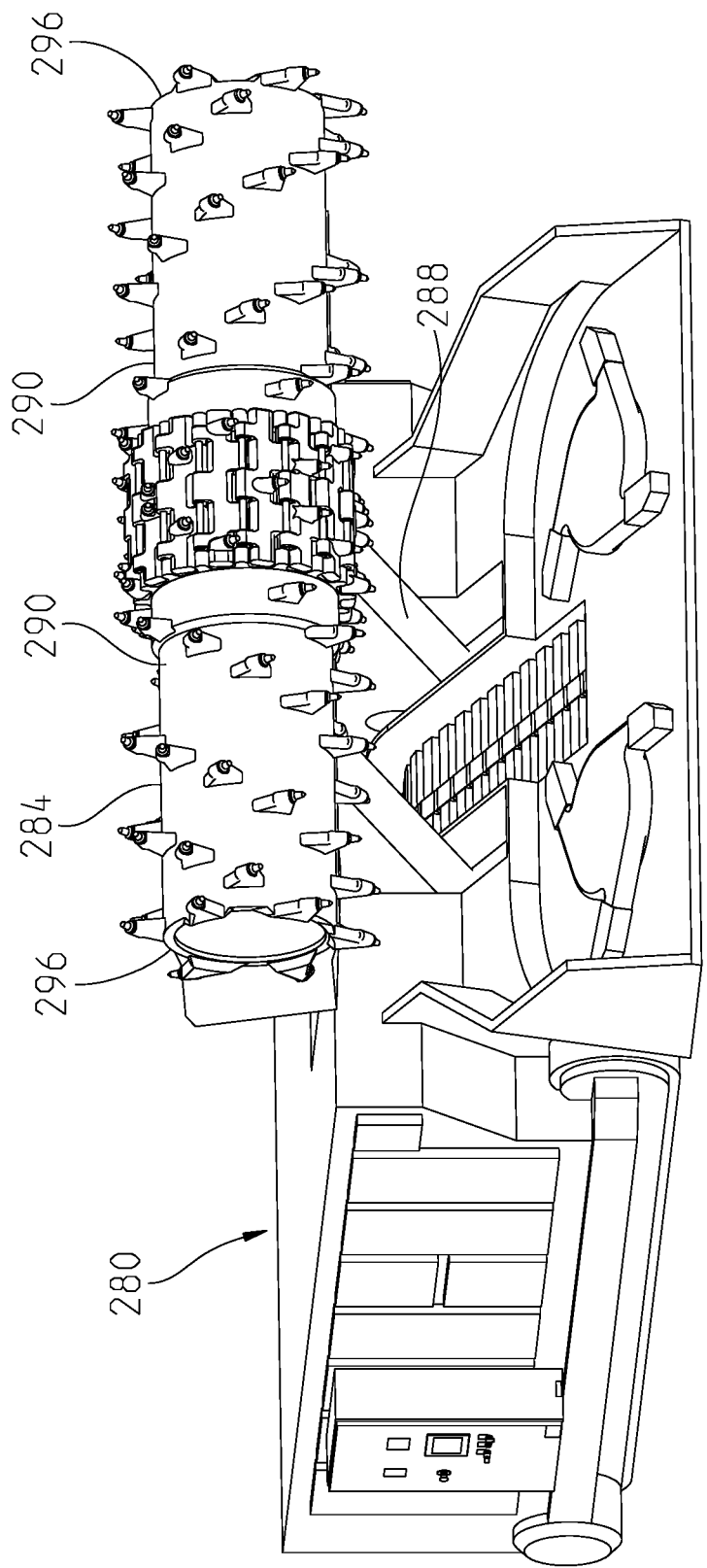
FIG. 18 is a center supported auger system according to the present invention.

FIGS. 18 and 19 illustrate another version of a mining machine 280 that has a drum 284 that is supported in its center about a pivotable arm 288. The proximal ends 290 of the drum 284 are supported by the arm 288 and distal ends 296 are cantilevered outwardly from the arm 288. FIG. 19 shows the internal measurement system 49 within the drum 284. In this case, the drum 284 includes openings 298 that allow the signal from the internal measurement system to be transmitted through the drum 284 and received by a receiving antenna 300 that is fixed from rotation with respect to the drum 284.

In some instances it may be desirable for an auger 14 to have slip rings 320 to transmit power and/or signal information through the auger 14. FIG. 20 shows an auger 14 with slip rings 320 near the gearbox 322 of the auger 14. The slip rings 320 may be used for sending power to sensors 324 in the auger 14 and may also be used to transmit signal data from sensors 324 within the auger 14. The slip rings 320 are located within a dust tight enclosure 328. The slip rings 320 can be used with any of the aforementioned configurations. When slip rings 320 are used to transmit signal data from sensors to a location outside of the auger 14, a transmitter 88 is not necessary for this purpose.

The invention is not limited to the embodiments described above, but may be modified within the scope of the following claims.

What is claimed is:

1. An auger system comprising:
   an auger rotatable about a central axis, said auger having a shaft including an outer diameter and an inner diameter, said auger having an inner chamber defined by said inner diameter, said outer diameter including features for conveying material adjacent to said auger;
   a power source located within said inner chamber, said power source providing electrical power to a measuring system contained within said inner chamber, said measuring system including a sensor for measuring a condition within said auger and said sensor producing a signal, said signal being transmitted via a transmitter located inside said inner chamber to a receiver spaced from said transmitter, said receiver transmitting said signal to a control system, said control system comparing said signal to a predetermined value to determine whether said condition is within an acceptable range;
   said control system altering inputs into components for moving said auger until said condition is within an acceptable range.

2. The auger system of claim 1, wherein said power source produces power in response to rotation of said auger about said central axis.

3. The auger system of claim 2, wherein said power source includes a magnet slidable within a tube and a coil surrounding said tube, wherein movement of said magnet through said coil produces electricity.

4. The auger system of claim 1, wherein said power source produces power in response to a light source illuminating a photovoltaic detector.

5. The auger system of claim 1, wherein said receiver is located at a location fixed from rotation with respect to said auger.

6. The auger system of claim 5, wherein said auger includes openings in said shaft, said transmitter capable of transmitting through said openings to said receiver.

7. An auger system comprising:
   an auger rotatable about a central axis, said auger having a shaft including an outer diameter and an inner diameter, said auger having an inner chamber defined by said inner diameter, said outer diameter including a spiral flight on said shaft for conveying material axially as said auger rotates about its said central axis;
   a measurement system contained within said inner chamber including an electrical power source located within said inner chamber and a sensor for measuring a condition within said auger, said sensor producing a signal, said signal being transmitted via a transmitter, said transmitter powered by said power source;
   a receiver spaced from said transmitter for receiving said signal, said receiver fixed with respect to said auger, said receiver for transmitting said signal to a control system, said control system comparing said signal to a predetermined value to determine whether said condition is within an acceptable range, said control system altering inputs into components for moving said auger until said condition is within an acceptable range.

8. The auger system of claim 7, wherein said components include an auger advance motor for moving said auger laterally and a drive motor for rotating said auger about said central axis of said auger.

9. The auger system of claim 8, wherein said auger advance motor rotates said auger about a fixed center point.

10. The auger system of claim 8, wherein an auger advance motor drives said auger laterally in a linear movement.

11. The auger system of claim 7, wherein said power source includes a permanent magnet contained within a tube, said tube being surrounded by a coil, said magnet movable within said tube in response to rotation of said auger so that power is generated as said magnet moves through said coil during rotation of said auger.

12. The auger system of claim 7, wherein said power source produces power in response to a light source illuminating a photovoltaic detector.

13. The auger system of claim 7, wherein said receiver is connected to a second transmitter for transmitting signals from said transmitter to said control system.

14. The auger system of claim 7, wherein said auger includes openings in said shaft, said transmitter capable of transmitting through said openings to said receiver.

15. The auger system of claim 7, wherein said transmitter is located within said inner chamber and said receiver is located outside of said auger and wherein said transmitter and said receiver make no contact.

16. An auger system comprising:
   an auger rotatable about a central axis, said auger having a shaft including an outer diameter and an inner diameter, said auger having an inner chamber defined by said inner diameter, said outer diameter including features for conveying material adjacent to said auger;
   a sensor to measure a condition within said auger, said sensor producing a signal, said signal being transmitted to a control system, said control system comparing said signal to a predetermined value to determine whether said condition is within an acceptable range; said control system altering inputs into components for moving said auger until said condition is within an acceptable range.

17. The auger system of claim 16, wherein said condition to be measured is deflection of said auger, and said auger system includes a light source for producing a light beam, and a detector for measuring a reflected distance from said light source to a reflective surface located inside said inner chamber of said auger, a first reflective surface is located relatively near said light source and a second reflective surface located farther from said light source than said first surface, said light beam striking said first reflective surface when said auger is in an undeflected state and said light beam striking said second reflective surface when said auger is deflected more than a particular amount, said detector producing a signal based on measuring the distance said light beam traveled to one of said reflective surfaces to indicate from which reflective surface said light beam was reflected.

18. The auger system of claim 16, wherein said components include an auger advance motor for moving said auger laterally and a drive motor for rotating said auger about said central axis of said auger.

19. The auger system of claim 16, wherein said condition to be measured is deflection of said auger, and said auger system includes a light source for producing a light beam;

said auger including a power source and transmitter located inside said inner chamber of said auger, said power source providing electrical power to a transmitter;

a receiver spaced from said transmitter for receiving said signal, said receiver fixed with respect to said auger, said receiver for transmitting said signal to said control system, said sensor including a detector located inside said inner chamber of said auger, said detector being illuminated by said light beam and measuring the radial distance of said light beam from the linear axis of said auger, said detector providing a signal to said transmitter, said transmitter transmitting said signal to said receiver.

20. The auger system of claim 19, wherein said power source includes a magnet slidably held within a tube, a coil encircling said tube and said magnet movable through said coil within said tube in response to rotation of said auger.

* * * * *